July 6, 1943.  E. C. ZIMMERMAN  2,323,697
LIGHTING EQUIPMENT
Filed April 20, 1940  4 Sheets-Sheet 1
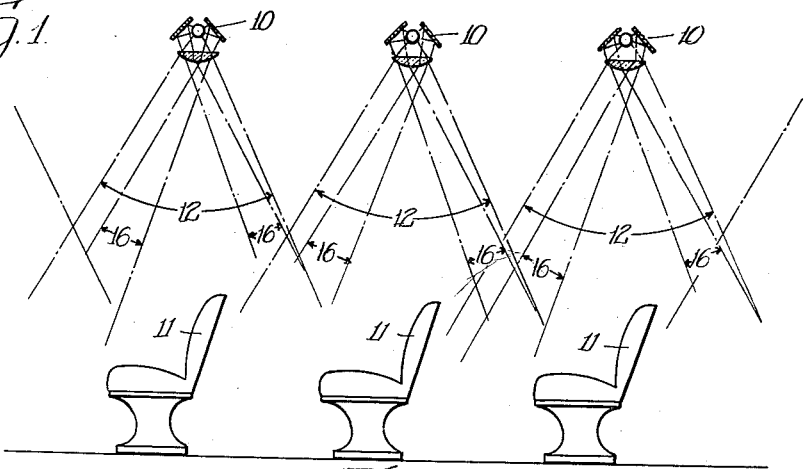
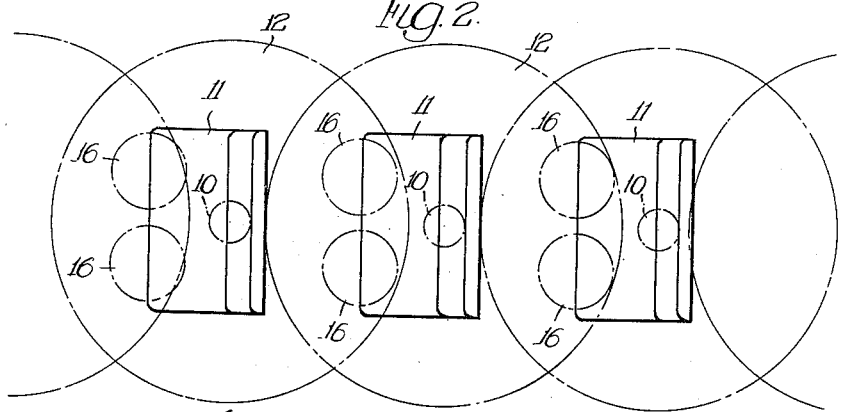
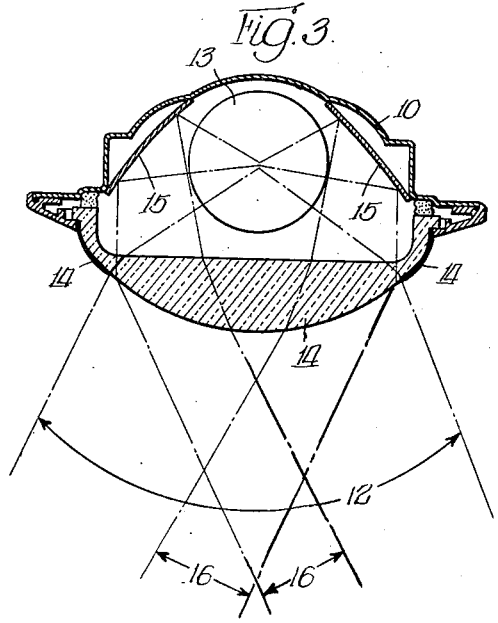
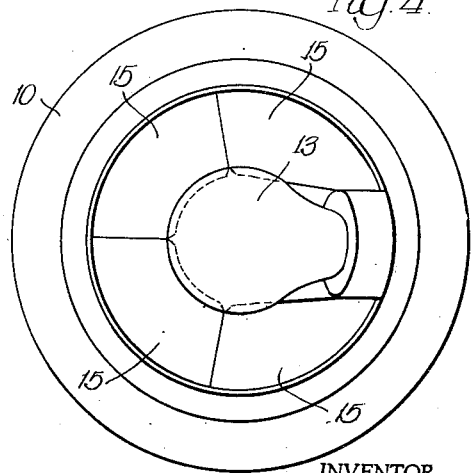
INVENTOR.
Edward C. Zimmerman
BY Cromwell, Greist & Warden
Attys.

July 6, 1943.   E. C. ZIMMERMAN   2,323,697
LIGHTING EQUIPMENT
Filed April 20, 1940   4 Sheets-Sheet 2

INVENTOR.
Edward C. Zimmerman,
BY Cromwell, Greist + Warden
attys.

July 6, 1943.   E. C. ZIMMERMAN   2,323,697
LIGHTING EQUIPMENT
Filed April 20, 1940   4 Sheets-Sheet 3
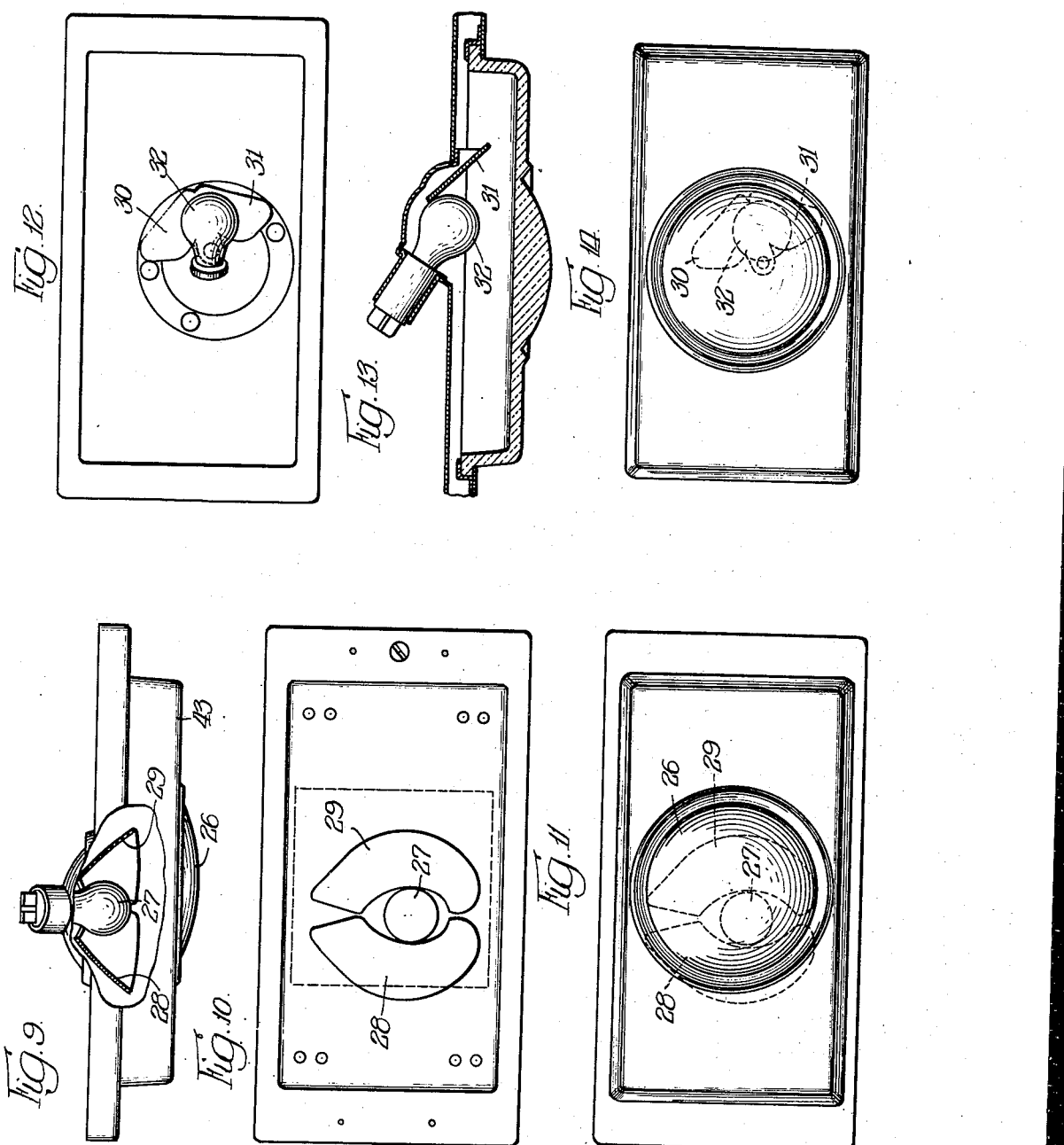
INVENTOR.
Edward C. Zimmerman,
BY Cromwell, Greist + Warden
attys.

July 6, 1943.　　　　　E. C. ZIMMERMAN　　　　　2,323,697
LIGHTING EQUIPMENT
Filed April 20, 1940　　　　4 Sheets-Sheet 4
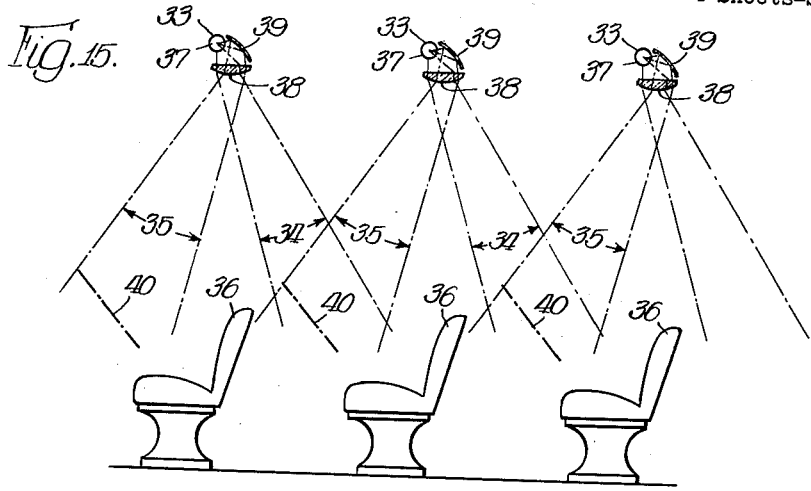
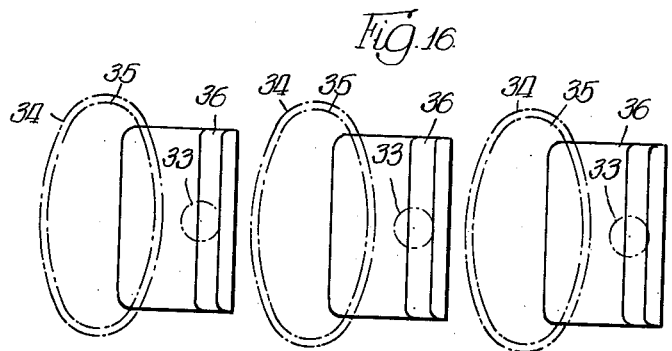
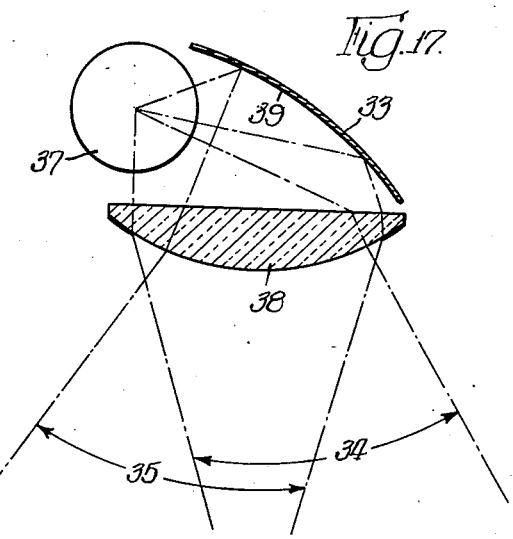
INVENTOR.
Edward C. Zimmerman,
BY Cromwell, Greist + Warden
attys.

Patented July 6, 1943

2,323,697.

UNITED STATES PATENT OFFICE 2,323,697

LIGHTING EQUIPMENT

Edward C. Zimmerman, Chicago, Ill., assignor to Patent License Corporation, Chicago, Ill., a corporation of Illinois Application April 20, 1940, Serial No. 330,789

2 Claims. (Cl. 240—7.35)

This invention has to do with the interior lighting of buses, streetcars and other passenger vehicles.

One of the principal objects of the invention is to provide, in lighting equipment of the character described, an improved one-light-over-a-seat arrangement in which lighting fixtures with condensing lenses are employed, and in which the beams from the lenses illuminating the seat areas are augmented within the reading plane portions only of such areas by the use of special reflectors.

Another important object of the invention is to provide a lensed lighting fixture in which the parts are so constructed and arranged as to produce one or more relatively small intensified lighting patterns of special shape within the main beam from the lens.

While the foregoing statements are indicative in a general way of the nature of the invention, other more specific objects and advantages will be apparent to those skilled in the art upon a full understanding of the construction, arrangement and operation of the improved lighting equipment.

A few embodiments of the invention are presented herein for the purpose of exemplification, but it will of course be appreciated that the invention is susceptible of incorporation in other modified forms coming equally within the scope of the appended claims.

In the accompanying drawings:

Fig. 1 is a view which illustrates schematically in side elevation the seats and lighting fixtures on the inside of a passenger vehicle, and the beams of light feeding the seat areas and the reading planes of the latter in accordance with the invention;

Fig. 2 is a view which shows the same arrangement in plan;

Fig. 3 is a vertical diametric section through one of the lensed lighting fixtures shown in Fig. 1;

Fig. 4 is a face view of the same lighting fixture, with the lens removed;

Fig. 9 is a side view of another lighting fixture constructed in accordance with the invention, with portions broken away to illustrate the arrangement of the reflectors and bulb with respect to the lens;

Fig. 10 is a face view of the fixture shown in Fig. 9, with the lens removed;

Fig. 11 is a face view of the same fixture with the lens in place;

Fig. 12 is a face view of still another fixture, with the lens removed;

Fig. 13 is a vertical longitudinal section through the fixture shown in Fig. 12;

Fig. 14 is a face view of the same fixture;

Figs. 15 and 16 are schematic views which show a further modification of the invention; and Fig. 17 is a vertical section through one of the lighting fixtures shown in Fig. 15.

Figure 5:
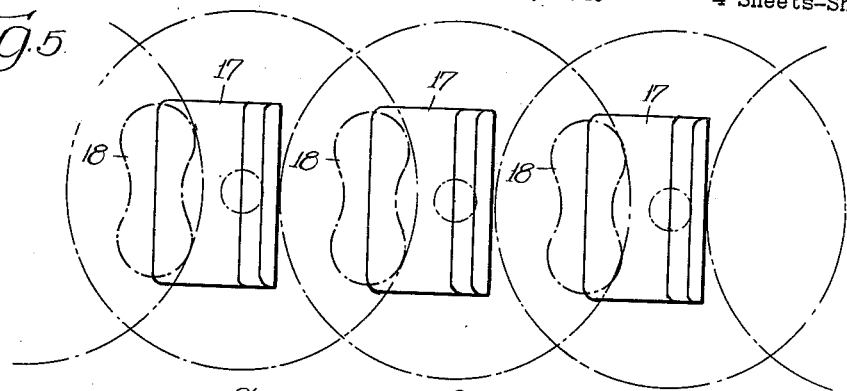
Figs. 5 and 6 are schematic illustrations which are similar to Fig. 2 but show modified lighting patterns.

The lighting arrangement shown in Figs. 1 and 2 is predicated on, and is in certain respects an improvement over, the one-light-over-a-seat controlled beam arrangement covered by Arenberg Patent No. 2,020,273. As will be observed, the improvement involves the use of a row of lighting fixtures 10 over a row of seats 11, with a fixture over each seat, and with the beam 12 from each fixture covering the entire seat area below the fixture and in addition covering the forward portion of the next seat area to the rear.

Each seat area may be considered, for the purpose of this disclosure, as including one of the seats 11 and the floor space generally in front of and immediately to the sides and rear of the same, but it will of course be appreciated that this area may be considered as larger, or smaller, or of other form than circular, depending on the size and shape of the main beam 12 lighting the same.

Each lighting fixture 10 includes a light bulb 13, a condensing lens 14 and a plurality of reflectors 15. The beam 12 is formed by the lens 14 from the direct rays of light emanating from the bulb 13. The reflectors 15 are so arranged with respect to the bulb 13 and the lens 14 as to produce, within the beam 12, relatively small intensified lighting patterns 16, which patterns are preferably so located and shaped as to cover the reading plane portions only of the area covered by the beam. These patterns 16 are formed near both the front and rear edges of the beam 12, with the rear lighting patterns 16 from the beam overlying the front lighting patterns of the next beam 12 to the rear, in substantial registration therewith. This arrangement puts the light where it is most needed.

The employment of front and rear reflectors 15 in each fixture, as shown in Figs. 3 and 4, with the rear patterns from one fixture overlying the front patterns from the next fixture to the rear, not only increases the amount of light on each reading plane but at the same time affords substantially shadowless illumination for the same.

In the modification shown in Fig. 5 the two reading planes of each of the seats 17 are covered by a single intensified lighting pattern 18 which extends the full width of the seat. Each of the patterns 18 can be formed either by using two reflectors or by using a single reflector which is so shaped as to give the desired elongation to the pattern.

Figure 6:
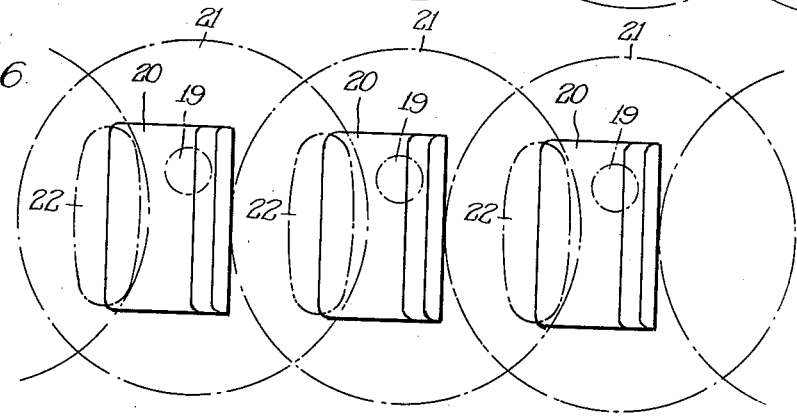
Figure 7:
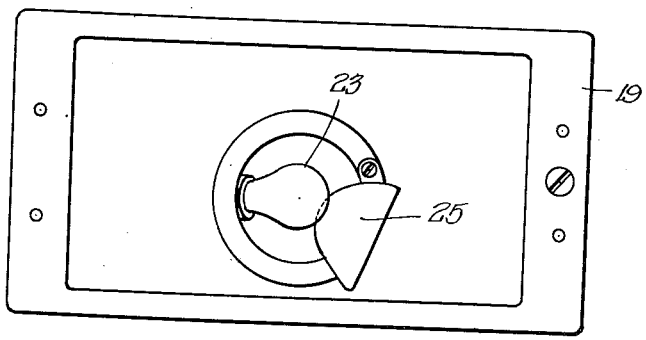
Fig. 7 is a face view of a lensed lighting fixture, with the lens removed, illustrating another lens-bulb-reflector arrangement suitable for use in producing special lighting patterns in accordance with the invention.
Figure 8:
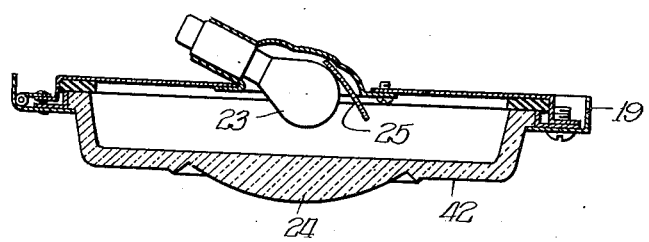
Fig. 8 is a vertical longitudinal section through the fixture shown in Fig. 7.

In the modification shown in Fig. 6 the lighting fixtures 19 (shown in dot-dash lines) are offset laterally with respect to the center line of the seats 20, with the bulbs in the fixtures correspondingly offset with respect to the lenses to place the main beams 21 in the positions shown. Also, in this modification the intensified lighting patterns 22 are elongated, and only one of the patterns is produced by each fixture, without the registration previously referred to. A fixture suitable for use in connection with this embodiment is shown in Figs. 7 and 8. In these views it will be observed that the bulb 23 is offset laterally with respect to the center of the lens 24 (indicated in dot-dash lines in Fig. 7) and that the reflector 25—in the form of a single member—is offset with respect to both the bulb and the lens.

In Figs. 9, 10 and 11 a typical fixture, equipped in accordance with the invention, is shown. This fixture includes a lens 26, a bulb 27 which is offset both laterally and longitudinally with respect to the lens, and two specially shaped reflectors 28 and 29, which reflectors are asymmetrically arranged with respect to both the bulb and the lens, at opposite sides of the bulb, the relative position of the parts being such as to produce the desired beam containing the relatively small intensified lighting patterns.

In Figs. 12, 13 and 14 another typical fixture is shown. In this fixture two integrally formed reflectors 30 and 31 are used, both on the same side of the bulb 32.

In the modification shown in Figs. 15, 16 and 17 each of the lighting fixtures 33 produces two diverging beams 34 and 35, instead of the previously described relatively large main beam and one or more small intensified beams within a portion only of the main beam. These two beams 34 and 35 from each of the fixtures are directed upon the reading planes of two of the seats 36 in the row. The beam 34 is formed by direct rays of light from the bulb 37 passing through the lens 38, and the beam 35—which may form a pattern either larger or smaller than, or of the same size as, the beam 34—is formed by indirect rays of light from the bulb reflected by the reflector 39 and passing through the lens. In this arrangement the beam 34 from one fixture registers on the reading plane of each seat with the beam 35 from the next fixture, the locations of the reading planes for the seats being generally indicated by the dot-dash lines 40 in Fig. 15.

In all of the above described embodiments of the invention the lighting fixtures are preferably provided, in addition to the clear lenses, with surrounding light diffusing portions, such as shown at 14 in Fig. 3, at 42 in Fig. 8 and at 43 in Fig. 9, which portions furnish subdued illumination for the walls, ceiling and aisle of the vehicle.

I claim:

1. In a lighting system for a passenger vehicle having a row of seats, lighting fixtures arranged in a row over the seats with one lighting fixture over each seat, each of said fixtures including a condensing lens which directs a beam of light over portions of the two seat areas immediately below and to the rear of the same, and an asymmetrically arranged reflector which reflects light received from a lamp positioned above said lens through the lens to produce a relatively small but intensified lighting pattern on the reading plane of one of the two seat areas lighted by the beam, which lighting pattern is eccentrically disposed with respect to the main beam.

2. In a lighting system for a passenger vehicle having a row of seats, lighting fixtures arranged in a row over the seats with one lighting fixture over each seat, each of said fixtures including a condensing lens which directs a beam of light over portions of the two seat areas immediately below and to the rear of the same, and asymmetrically arranged reflectors which reflect light received from a lamp positioned above said lens through the lens to produce a relatively small but intensified lighting pattern on each of the reading planes of the two seat areas lighted by the beam.

EDWARD C. ZIMMERMAN.